United States Patent [19]
Julian

[11] Patent Number: 5,083,131
[45] Date of Patent: Jan. 21, 1992

[54] LOCAL COMPENSATION OF FAILED ELEMENTS OF AN ACTIVE ANTENNA ARRAY

[75] Inventor: Michael D. Julian, Playa Del Rey, Calif.

[73] Assignee: Hughes Aircraft Company, Los Angeles, Calif.

[21] Appl. No.: 531,200

[22] Filed: May 31, 1990

[51] Int. Cl.⁵ ............................................... G01S 7/40
[52] U.S. Cl. .................... 342/372; 342/373; 342/374; 342/174
[58] Field of Search ............... 342/372, 373, 174, 165, 342/173

[56] References Cited

U.S. PATENT DOCUMENTS

| | | | |
|---|---|---|---|
| H173 | 12/1986 | Claborn et al. | 342/372 |
| 4,217,587 | 8/1980 | Jacomini | 342/372 |
| 4,359,740 | 11/1982 | Frazita | 343/703 |
| 4,414,632 | 11/1983 | Murrell | 364/487 |
| 4,445,119 | 4/1984 | Works | 342/377 |
| 4,453,164 | 6/1984 | Patton | 342/360 |
| 4,517,570 | 5/1985 | Gray, Jr. | 342/372 |
| 4,520,361 | 5/1985 | Frazita | 342/372 |
| 4,811,023 | 3/1989 | Gelernter et al. | 343/703 |
| 4,926,186 | 5/1990 | Kelly et al. | 342/360 |
| 4,949,090 | 8/1990 | Tamii et al. | 342/173 |

*Primary Examiner*—John B. Sotomayor
*Attorney, Agent, or Firm*—Leonard A. Alkov; Wanda K. Denson-Low

[57] ABSTRACT

Compensation for a failed element of an active antenna array is acheived by turning the failed element off and selecting a plurality of adjacent, properly working elements as local compensators. A selected voltage and phase increment is then added to the complex output voltage which each local compensator would normally produce. The magnitude of the voltage increment is selected by dividing the magnitude of the failed element's voltage, were it not failed, by the number of compensators. The phase increment is selected to scan the associated voltage increment at a depression angle of about 30 degrees below the horizon.

19 Claims, 5 Drawing Sheets

NO FAILURES

FIG.6

FAILURES

FIG.7

FAILURES AND COMPENSATION

LOCAL COMPENSATION OF FAILED ELEMENTS OF AN ACTIVE ANTENNA ARRAY

BACKGROUND OF THE INVENTION

1. Field of the Invention

The subject invention relates generally to antennas and, more specifically, to a method for compensating for failed elements of an active antenna array.

2. Description of Related Art

The advent of active array technology has opened up a new vista of radar detection and tracking possibilities. One now has unprecedented control of phase and amplitude separately on transmit and receive, as well as nearly instantaneous beam positioning.

But with such fine phase and amplitude control comes an additional penalty—namely, an error source due to element failures. In the course of time, such failures accumulate, gradually degrading system performance. At some point, a performance threshold is crossed, necessitating a hardware overhaul.

Basically, element failures produce random amplitude errors in the antenna weighting, causing an average increase in antenna sidelobes. This is especially serious in directions below the horizon due to additional clutter desensitizing medium PRF waveforms. The effect is to reduce detection sensitivity by decreasing the signal-to-junk ratio.

The most general approach to compensating for failed elements uses a steepest descent global compensation in which all elements are adjusted such that the total pattern is minimized in particular directions. This method requires storage of thousands of complex weights computed off-line for each particular configuration of failures.

The disadvantages of global compensation are significant. The steepest descent computation necessary to find the new weights is very time consuming. Hence, it is not generally appropriate for computation in a tactical system and certainly not possible dynamically during beam repositioning. Since previous global compensation strategies involve minimizing energy toward the ground in the entire antenna pattern, there is no easy way of allowing for electronic beam scans for a given set of element failures. The upshot is that massive tables of complex weights must be stored for each configuration of failures, including the thousands of elements and each of the possible scan directions. This solution is not only inelegant in practice, it is infeasible.

SUMMARY OF THE INVENTION

Accordingly, it is an object of the invention to improve antenna systems;

It is another object of the invention to improve performance of active antenna arrays;

It is another object of the invention to simplify and reduce the overall cost of such arrays;

It is another object of the invention to provide a method for compensating for failed elements of an active antenna array;

It is another object of the invention to provide such a method while avoiding a steepest descent, global compensation approach; and It is still another object of the invention to increase the working lifetime of active antenna arrays.

According to the invention, local compensation is provided for failed elements of an active antenna array. The local method applies a simple phase and amplitude weight adjustment for the nearest neighbors above and below the failed element, requiring no storage of complex weights and working incrementally for each failure.

According to the invention, nearest neighbor element voltage increments form a small compensation subarray scanned toward the ground, cancelling out the error produced by the failed element at a particular depression angle. The average sidelobe level in the vicinity is also reduced.

The approach according to the invention uses the concept of a differential antenna pattern. The differential pattern is that part of the antenna pattern produced by the failure or compensator elements alone. The sum of the failure and compensator differential patterns is minimized toward the ground, rather than the total pattern from all the elements. In practice, this means that each time an antenna element fails, compensation is added to a subarray of its nearest neighbors. When the next element fails, the new compensation generally has no effect on the scheme for the previously failed elements. Similarly, the previous compensation generally has no effect on the compensation for the latest failure.

The local compensation method is particularly advantageous in cases where the antenna beam is electronically scanned in different directions. For each new scan direction, the compensation must be changed. This is extremely easy for local compensation, and may be done dynamically during scanning. Global compensation is not nearly so adaptable. In short, the local compensation method is self-contained, requiring no off-line computation.

BRIEF DESCRIPTION OF THE DRAWINGS

The just-summarized invention will now be described in detail in conjunction with the drawings, of which.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a particularly useful and advantageous method of locally compensating for failed antenna array elements.

Figure 1:
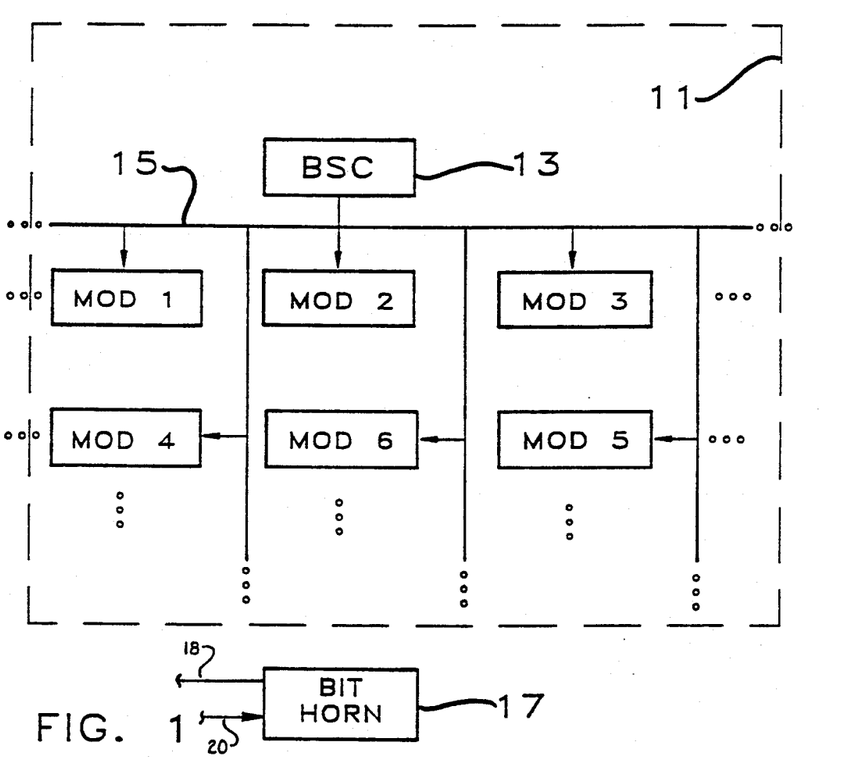
FIG. 1 is a schematic block diagram illustrating an active antenna array.

FIG. 1 illustrates an active array antenna system 11, which includes a conventional beam steering computer (BSC) 13 and a number of conventional antenna modules or elements MOD1, MOD2, MOD3 . . . , which communicate over a bus system 15. The BSC 13 provides signals to set the transmit and receive phase and gains of the modules MOD1, MOD2, MOD3 . . . It may also enable or disable the power or low noise amplifiers of the modules MOD1, MOD2, MOD3, . . . It may turn off a module MOD1, MOD2, MOD3 . . . , select the polarization direction, and send out operational information such as the RF frequency, all as known in the art. In FIG. 1, a small microwave BIT horn 17 is also placed in front of the antenna 11.

Figure 2:
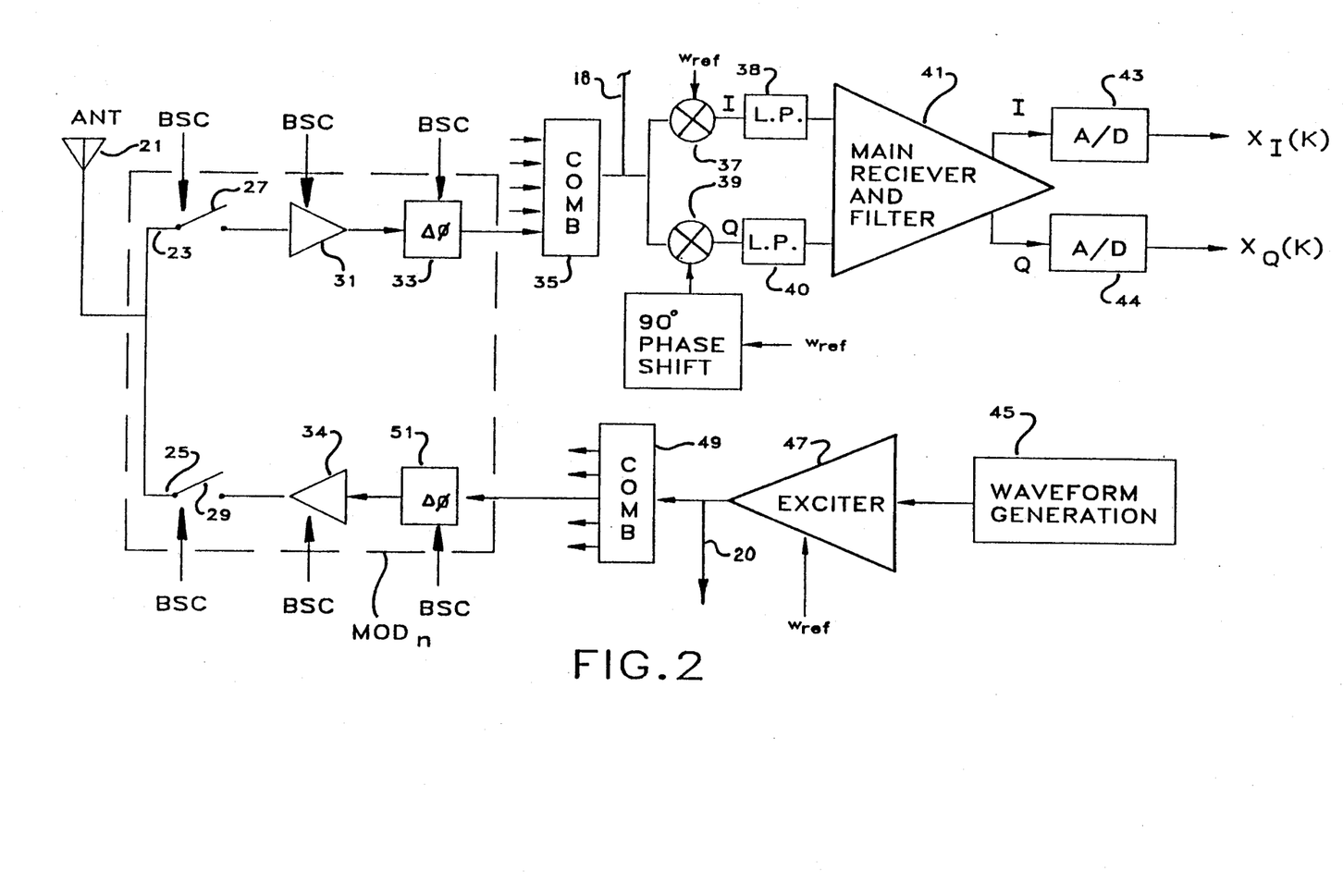
FIG. 2 is a schematic block diagram illustrating the generic structure of the elements or modules of the array of FIG. 1.

FIG. 2 illustrates a typical element MODn of the element array MOD1, MOD2 . . . In this element MODn, an antenna element 21 is connected to both a receive path 23 and a transmit path 25. Respective switches 27, 29 are placed in the receive path 23 and transmit path 25 to alternately connect the antenna 21 to either a low noise input amplifier (LNA) 31 or a power output amplifier 34. As indicated, closing of the switches 27, 29 is under control of the beam steering computer 13, as is the gain of each of the amplifiers 31, 34.

The LNA 31 outputs to a receive phase shifter 33, which supplies a phase shifted output signal or pulse to an analog combining network 35. The amount of phase shift is selected by the BSC 13 and is typically applied through a series of phase increments, numbering, for example, 32. The combining network 35 receives the outputs of each receive phase shifter 33 of all the other elements MOD1, MOD2 . . . and adds the RF analog signals together. The output voltage of the combining network 35 is mixed by respective mixers 37, 39 with a reference oscillator signal at a reference frequency $\omega_{ref}$ and the same signal $\omega_{ref}$ shifted in phase by 90 degrees, thereby forming in-phase and quadrature outputs I, Q. These outputs I, Q are filtered by respective low pass filters 38, 40 and supplied to a main receiver and filter 41 which outputs analog signals to first and second A/D converters 43, 44. Each A/D converter 43, 44 samples its input to produce a succession of IQ samples $x_Q(k) = x_I(k) + j x_Q(k)$. Those skilled in the art will appreciate that the digitized signal $x_Q(k)$ represents a signal where a relatively nonmoving target in the environment (zero doppler) produces a DC signal.

On the transmit side of the element MODn, the power amplifier 34 is supplied with an input signal generated as follows. A waveform generator 45 generates a waveform which is supplied to an exciter 47. The exciter 47 supplies an RF signal synched to the reference oscillator frequency $\omega_{ref}$ and outputs to a combiner 49. The combiner 49 distributes low level RF energy to all the modules, including transmit phase shifter 51 of the module MODn and the transmit phase shifters of the other elements MOD1, MOD2 . . . The transmit phase shifter 51 imparts a phase shift selected by the BSC 13 to its input signal and supplies the phase shifted signal to the input of the power amplifier 33.

On transmission, an element MOD1, MOD2 . . . takes exciter power, amplifies it, shifts the phase, and then radiates. On receive, the process is reversed. The received energy is amplified, phase shifted, then sent to the receiver 41. Those skilled in the art will appreciate that various configurations of module, receiver, and transmit circuitry may be used according to the invention, aside from that shown in FIG. 2.

To minimize the error induced by failed antenna array elements MOD1, MOD2, MOD3 . . . , we first look at the effects of the failure on sidelobe level. There are many ways in which an element MODn can fail. One of these is "light failed," where the antenna element MODn sticks at a certain phase and amplitude; another is "dark failed," where the antenna element MODn is off, i.e., is not radiating energy. The sidelobes in the dark failed case are easily calculated and rewritten below:

$$SL = \frac{B}{N} p \cos^\alpha \theta \qquad (1)$$

This Equation (1) is an approximation for a small number of failures. Here B is the beam broadening factor due to amplitude weighting, N is the number of elements, p is the fraction of failed elements, $\theta$ is the angle from boresight to the sidelobe in question. The exponent $\alpha$ is a parameter dependent on the hardware, which is ordinarily near "1" in value.

The light failed case has twice the sidelobe level of the dark failed case, which corresponds to 3 dB of improvement from simply turning off the element MODn. Though light failure is only one mode of failure, turning off the element MODn will limit the effects to those of dark failures, which can be evaluated and quantified empirically.

Figure 9:
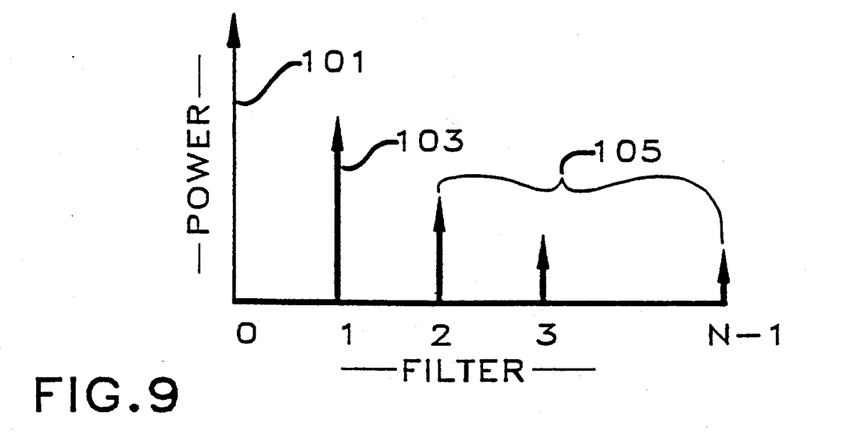
FIG. 9 is a graph illustrating an FFT power spectrum.
Figure 10:
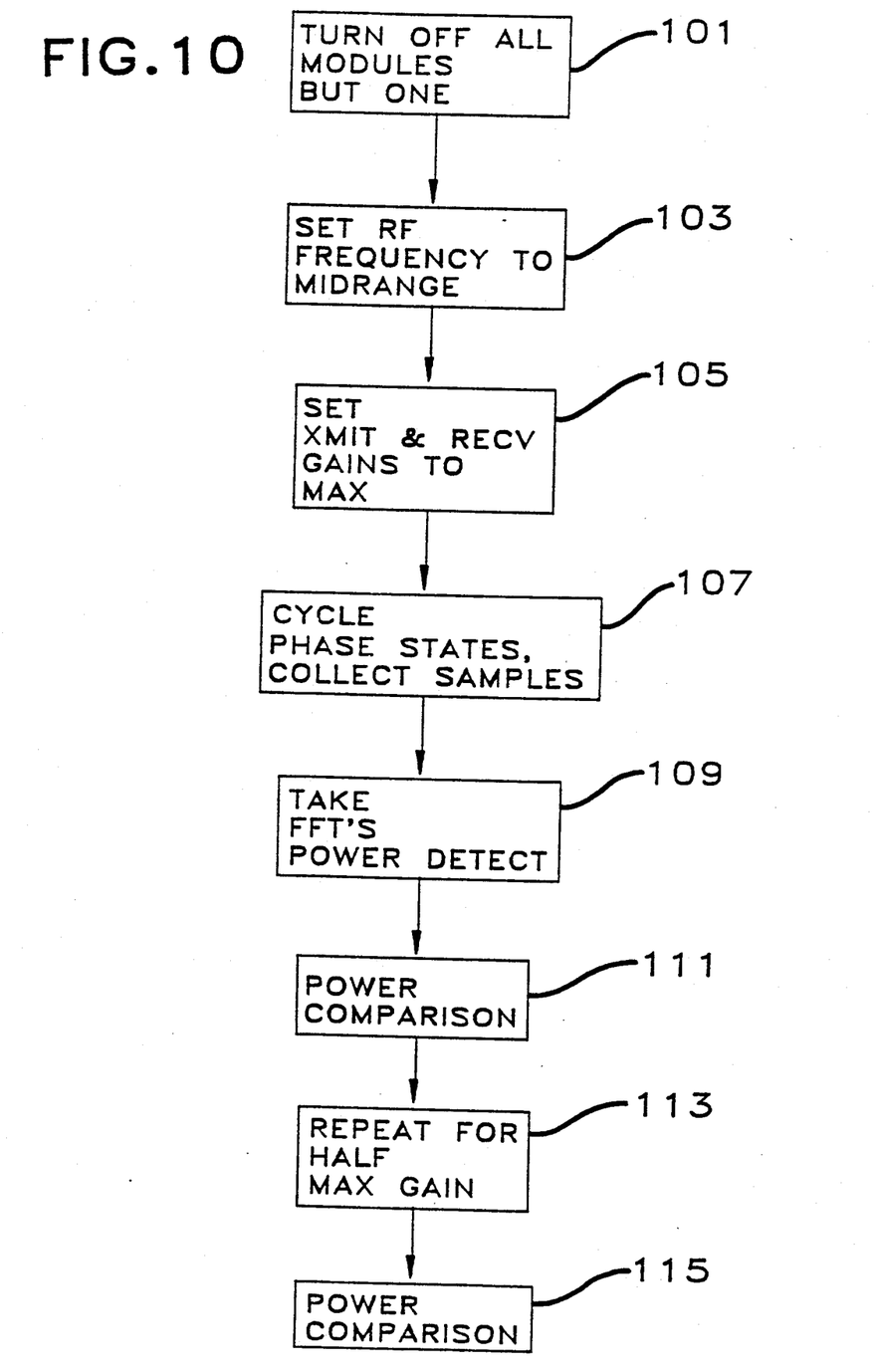
FIG. 10 is a flow chart illustrating a method for detecting a failed antenna array element or module.

Because of the benefits of dealing with dark failures noted above, once a failed element 121 (FIG. 3) is found, for example, by the method described hereafter in connection with FIGS. 9 and 10, it is turned off. Incremental compensation begins with local compensation of the failed element 121. With local compensation, a subarray of the four nearest neighbors 113, 115, 117, 119 of the failed element 121 is chosen to compensate for it, as in FIG. 3. The compensation added to each neighboring element 113, 115, 117, 119 is composed of two parts. As described in more detail below, the first part is a fraction of the failed element's complex voltage, and the second is a phase shift, which scans this voltage fraction toward the ground.

The motivation for this compensation approach comes from the desire to keep the voltage output constant at a certain scan angle. Let the voltage in a particular direction of the signal radiated by all of the antenna elements 21 of all of the modules MOD1, MOD2 . . . of the array without failures be $V_o$:

$$V_o = \sum_k w_k \cdot \exp(j \cdot \phi_k) \qquad (2)$$

where $\phi_k$ is the phase from element k in a particular look direction. $w_k$ is the voltage at the radiating element k.

When the $k^{th}$ element fails, the voltage can be expressed as $$V = V_o - w_k \exp(j \cdot \phi_k) \qquad (3)$$

Figure 3:
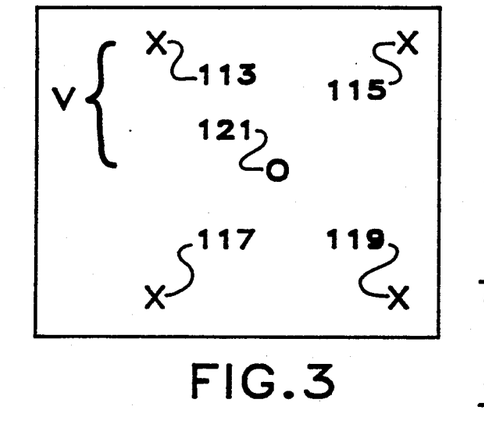
FIG. 3 is a schematic front view of an antenna subarray useful in illustrating the preferred embodiment.

To compensate for an element failure, each of the four nearest neighbor elements (compensators) 113, 115, 117, 119, receives a complex voltage increment, for example, through BSC control of its respective phase shifter 51 and power amplifier 34. This increment consists of a fraction of the original failed element voltage which is scanned above the ground. The increment of compensation is $$C_i = f \cdot w_k \cdot \exp(j \cdot \phi_k) \cdot \exp(j \cdot v_{comp}) \quad (4)$$

where $v_{comp}$ is the phase difference between the failed element and the compensator for the compensation scan angle, $\theta_s$, and f is the fraction of the failed element voltage. Note that $\theta_s$ is not the main beam scan angle; it is the compensation scan angle below the horizon.

Figure 4:
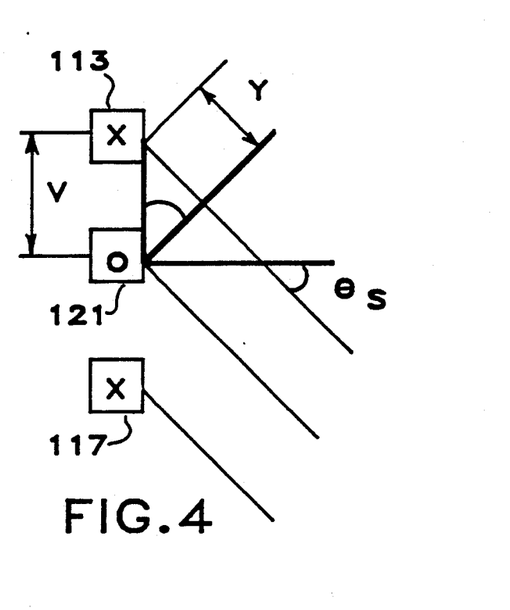
FIG. 4 is a side view of the subarray of FIG. 3.

The phase difference is found from the geometry in FIG. 4, which is a side view of FIG. 3. The distance between the top compensator 113 and the failed element 121 along the scan angle $\theta_s$ is y, which corresponds to the phase difference, $v_{comp}$:

$$v_{comp} = \frac{2\pi}{\lambda} \cdot y \quad (5)$$

Distance y is found from the geometry as the sine of the scan angle $\theta_s$ multiplied by the vertical distance v between the compensator 113 and the failed element 121. The phase difference is then $$v_{comp} = \frac{2\pi \cdot v}{\lambda} \cdot \sin \theta_s$$

The compensating increment $C_{top}$ for the top elements 113, 115 in FIG. 3 is $$C_{top} = f \cdot w_k \cdot \exp(j \cdot \phi_k) \cdot \exp\left(-j \cdot \frac{2\pi \cdot v}{\lambda} \sin \theta_s \right) \quad (6)$$

The phase of the bottom element 117 in FIG. 4 is ahead of the failed element's phase by $v_{comp}$, so that the compensating increment $C_{bott}$ is $$C_{bott} = f \cdot w_k \cdot \exp(j \cdot \phi_k) \cdot \exp\left(+j \cdot \frac{2\pi \cdot v}{\lambda} \sin \theta_s \right) \quad (7)$$

for both the bottom elements 117, 119 of FIG. 3.

The compensated voltage for a look angle $\theta$ below the horizon in the vertical plane is given by $$v = v_0 + w_k \exp(j \cdot \phi_k) \left[ \begin{array}{l} -1 + 2 \cdot C_{top} \exp(-j\phi_k) \cdot \exp\left(j \cdot \frac{2\pi v}{\lambda} \sin \theta \right) + \\ 2 \cdot C_{bott} \exp(-j \phi_k) \cdot \exp -\left(j \cdot \frac{2\pi v}{\lambda} \sin \theta \right) \end{array} \right] \quad (8)$$

The bracketed term in Equation (8) which multiplies the uncompensated error is the error factor EF. The goal is to choose f and $\theta_s$ so as to minimize the magnitude of EF. In fact, a zero value of EF results in $V = V_0$ from Equation (8); that is, the compensated voltage in this case would be identical to the voltage with no failures. The complex exponential terms in the equation are the geometric phase contributors as seen from FIG. 4. Using Equations (6)–(8) one obtains $$EF = 4 \cdot f \cdot \cos\left[\frac{2\pi v}{\lambda} \cdot (\sin \theta - \sin \theta_s)\right] - 1 \quad (9)$$

Equation 9 may be plotted as a function of the look angle $\theta$ for various choices of the adjustable parameters f or $\theta_s$. In general, EF is not a strongly peaked function of $\theta_s$. The value of $\theta_s = $ 30 degrees works reasonably well. The error is zero when the fraction of the failed element's voltage is 0.25 at $\theta = \theta_s = 30$ degrees; so the compensation pattern matches the failed element's pattern at the compensator scan angle $\theta_s$ for f=0.25. Typically, one chooses f equal to the reciprocal of the number of nearest neighbors above and below a failure. Thus, f=0.25 for the diamond lattice of FIG. 3, and f=0.5 for the rectangular lattice of FIG. 5. Note that Equation (9) defines EF for the diamond lattice. For the rectangular case, the "4" in Equation (9) is replaced by "2" (i.e., only two compensators).

To maximize the compensation, the choice of the fraction of the failed element's voltage was investigated. Trial and error of fractions from 0.25 to 0.8 in the compensation subroutine suggested that f=0.35 minimized sidelobes slightly more effectively over the ground when there was no scan of the main beam. The compensation direction is maintained toward the ground directly below the beam even with scanning. The effect of increasing the fraction is to unbias the error in the compensating pattern. One should note that this optimal fraction cannot always be added to the compensating elements because of saturation, as discussed below.

Saturation limits the fraction of the failed element's voltage which can be added. With a real antenna, the highest weights are achieved at saturation for maximum power output. If a compensation scheme increases an element's magnitude so that it becomes greater than the saturation value for output, then saturation limits the output and, consequently, the compensation.

Thus, according to the preferred embodiment, when an element MODn fails, one uses the local compensation method described above. If local compensation causes saturation on an element, then the same calculation is made as before, but saturation limits the magnitude of the new voltage at its new phase. When implemented, a real antenna would saturate and consequently limit the magnitude. The mathematical model retains the phase of the newly-calculated voltage and changes the magnitude to the saturation value.

Since the complex voltages of the failed element, e.g. 121, and of each neighbor change at every scan angle, the compensation must be updated for each compensating neighbor at every scan angle of the main beam. The effectiveness of this scheme to compensate for each failed element 121 as much as possible is described below.

Figure 5:
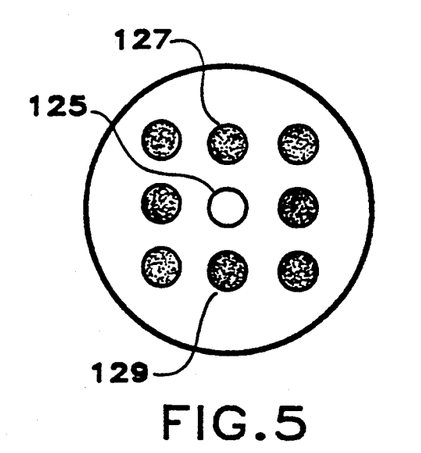
FIG. 5 is a schematic diagram illustrating an alternate antenna subarray according to the preferred embodiment.
Figure 11:
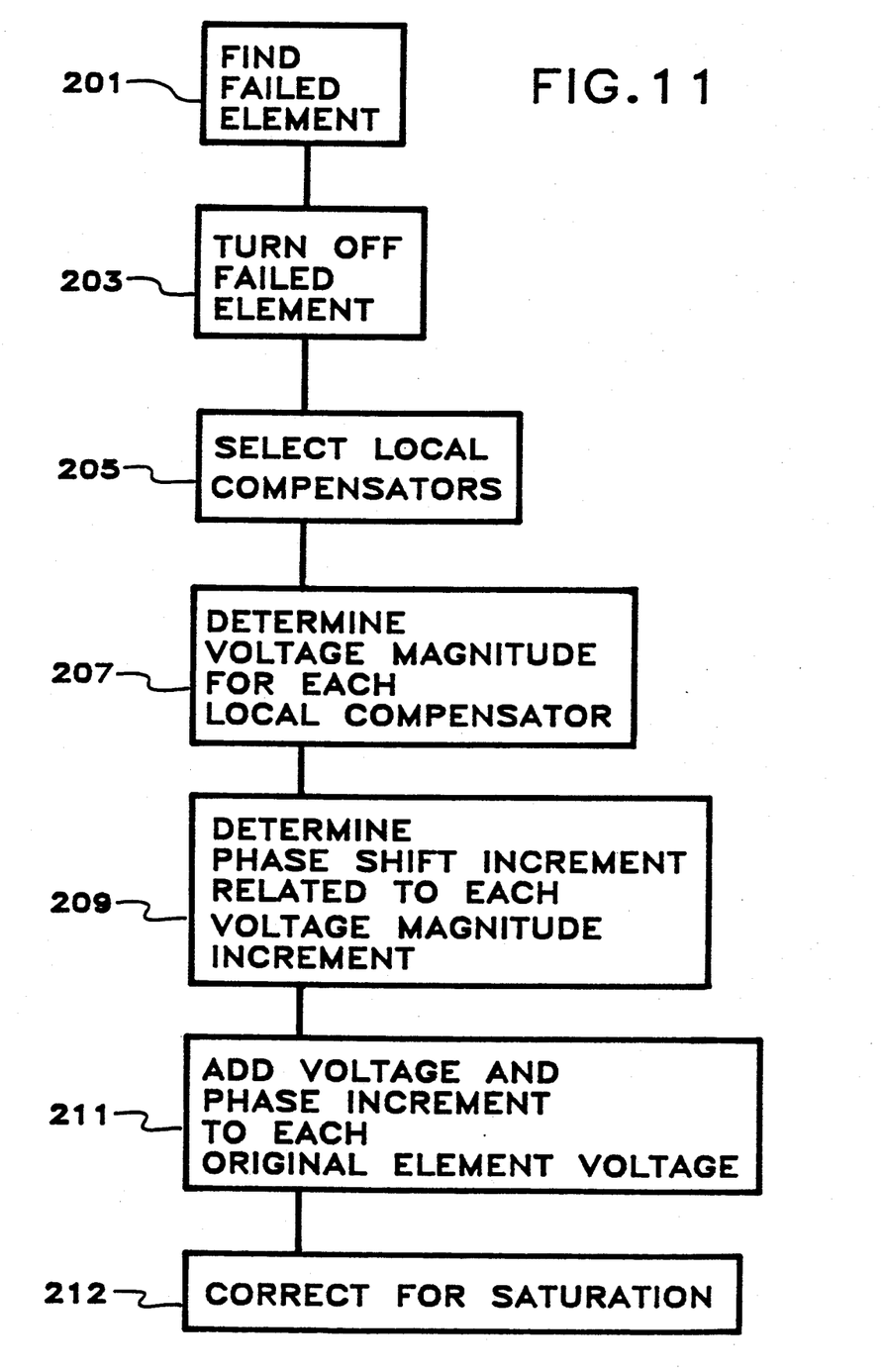
FIG. 11 is a flow chart illustrating the method according to the preferred embodiment.

The procedure according to the preferred embodiment for each element 121 that fails may be set forth in the following step-by-step fashion, depicted in FIG. 11:

a. Find the failed element, e.g., 121, step 201.
b. Turn it off using the control of the beam steering computer 13 (FIG. 1), step 203.
c. Select the nearest neighbor elements above and below the failure as compensators, step 205. For example, as shown in FIG. 5, a rectangular lattice has one element 127 above and one element 129 below the failed element 125, while the diamond lattice shown in FIG. 3 has two elements 113, 115 above and two elements 117, 119 below the failed element 121 to the right and to the left.

d. Compute the magnitude of the voltage compensation increment for each local compensating element by dividing the magnitude of the voltage signal of the failed element 121 when it was still working by the number of compensating elements, step 207. Thus, for a rectangular lattice, the increment is one-half that of the original element that failed. This value may be altered slightly, but this magnitude is effective.

e. Compute the phase of each of these voltage compensation increments necessary to scan the compensator increments at about 30 degrees below the horizon, step 209. This is accomplished by setting the phase of the upper increment to that of the original failed element minus a phase $\Delta\phi$, and the phase of the lower increment to the original phase of the failed element plus $\Delta\phi$. Here the phase change $\Delta\phi$ is given by $$\Delta\phi = \frac{2\pi s}{\lambda} \sin \theta \qquad (10)$$

In Equation (10), "s" is the vertical spacing of the compensating elements above and below the failure; $\lambda$ is the wavelength of the emitted or received signal; and $\theta$ is the desired depression angle (30 degrees).

f. Add the complex voltage increments whose amplitude and phases were computed in steps d and e to the original complex voltages of the selected compensating elements, step 211.

g. If the magnitude of the resultant voltage exceeds the saturation amplitude of the local compensation element, set the amplitude to the saturation value, but keep the phase at the resultant value, step 212. These complex voltages are the total compensation voltages at the nearest neighbors.

Figures 6, 7:
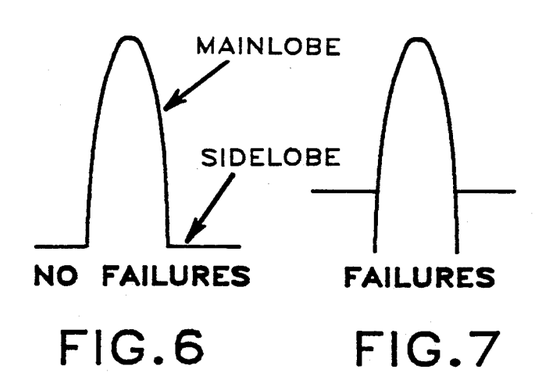
FIGS. 6–8 are schematic diagrams useful in illustrating the effect of failure and compensation on an antenna pattern.
Figure 8:
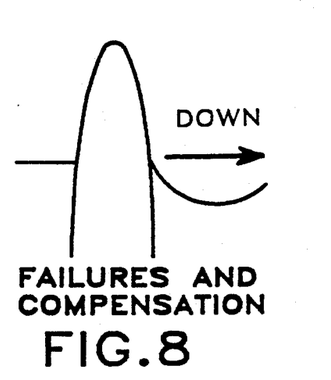

FIGS. 6–8 schematically show the effect of failures and compensation on antenna pattern sidelobes. As expected, failures increase the sidelobe level (FIG. 7), while compensation reduces it below the horizon (FIG. 8), thereby reducing clutter effects.

As indicated above, prior to turning off a failed element or module, one must locate the failed element, which requires a technique of evaluating module performance. One such technique is now described, which may make use of a BIT horn such as the BIT horn 17 disclosed in FIG. 1.

The BIT horn 17 of FIG. 1 is used in the process of detecting failed elements MODn. The BIT horn 17 is a passive probe such as an open flared pipe, and is capable of both transmission and reception. All of the elements MOD1, MOD2, MOD3 . . . except the one under test, also referred to hereafter as the "active module," are then turned off, and an evaluation is made, according to the procedure to be described. The procedure is preferably and readily implemented by control and calculation performed by a programmable signal processor. Typically, such a signal processor is a computer separate from the BSC 13, and which may control the BSC 13 if desired.

According to the preferred embodiment, when the module under test, MODn, is in the transmit mode, the signal radiated by the antenna element 21 is received by the BIT horn 17 and input to the receiver circuitry at input 18, after the combiner 35. When the module under test, MODn, is in the receive mode, the output of the exciter 47 is tapped by line 20 to the BIT horn 17, which then radiates the low level exciter RF energy synched to the master oscillator frequency $\omega_{ref}$ to element 21 of the module under test, MODn, and thence into the receiver 41. Signal lines 18 and 20 are thus switched alternately to the BIT horn 17 by suitable switches in synchronism with the operation of the switches 27, 29.

One of the most severe problems associated with evaluating a single element, e.g., MODn, in an array of modules MOD1, MOD2, MOD3 . . . is that of leakage. Turning off an element such as MODn is achieved by turning off its amplifiers 31, 33 in response to control signals from the BSC 13. Even though these amplifiers 31, 34 are turned off, power from the exciter 47 may still leak through the module assembly and be radiated. Similarly, for receive tests, energy radiated at the antenna 21 from the BIT horn 17 may leak through the elements MOD1, MOD2, MOD3 . . . and be received. Thus, an element, e.g., MOD1, in the "off" state acts like an attenuator, rather than an open circuit. The leakage power from several thousand leaking modules will likely swamp the power of a single active module MODn, thus making detection of the performance of the active module MODn impossible.

The problem of leakage is largely eliminated by observing that the composite leakage voltage is at a fixed phase with respect to the exciter or BIT horn voltage. The active element MODn is also at a fixed phase to the leakage power. Thus, if the phase of the element MODn is rotated, its output acts like an AC signal on top of a large DC background of leakage. A Fourier transform can then separate out the module energy.

According to the preferred embodiment, a set of IQ pulses or signals equal to the number of phase shifter states is measured. If the phase of the active element MODn is rotated sequentially between each measurement, its energy is separable from the background. Measurement of the IQ pulses is conveniently done and analyzed according to the embodiment of FIG. 2 by utilizing the digital outputs $x_I(k)$ and $x_Q(k)$.

The scheme according to the preferred embodiment is designed to place the leakage power into filter 0 (the FFT for the first state) and the element power into filter 1 (the FFT for the second state). The other FFT filters may receive power depending on the nonuniformity of phase and amplitude variations as the phase is rotated. If too much power lies in these filters, then the module phase or amplitude accuracy is bad. The procedure is preferably repeated for another gain setting to check attenuator function and accuracy.

As a more detailed example of the scheme according to the preferred embodiment, assume that N, the number of phase shifter states, is the typical 32. The active element MODn then increments its phase by one state at each command or "sync" from the BSC 13. These syncs can be programmed to occur at one-millisecond (ms) intervals. The active element MODn is additionally switched between transmit and receive for each phase state. The BIT horn 17 transmits or receives alternately with the active element MODn.

This procedure yields 64 IQ samples for a given frequency in 32 ms. Then two 32-point FFTs are taken from the alternate transmit and receive configurations. The FFT taken on the 32 IQ samples from the receiver 41 when the module MODn is in the transmit state and the BIT horn 17 supplies the received signal over line 18 verifies operation of the transmit phase shifter 51 of the module MODn. The FFT taken on the 32 IQ samples from the receiver 41 of the module MODn when the module MODn is in the receive state and the BIT horn 17 radiates the signal received over line 20 verifies operation of the receive phase shifter 33 of the module MODn.

The process is thereafter repeated with the LNA and power amplifiers 31, 33 set to half gain. Thus, each 1000 elements at a given RF frequency require about one minute of total testing. Since the tests are independent from element to element, the entire procedure may be partitioned into short background tasks.

An instructive mathematical analysis of the preferred method can be made based on the following observations, assumptions, and notational definitions. First, one may observe that, if the 32 phase states were precisely separated by the nominal 11.25 degrees, then the rotated phase would produce a perfect sinusoid. Normally, however, there is an RMS phase error, which is hereafter denoted "$\phi$." Also, the amplitude may vary slightly with phase state, and the standard deviation of the amplitude error is hereafter denoted "b." Assume that these phase and amplitude errors are mean zero. Further, it is assumed for simplicity that the phase error is uniformly distributed.

When the FFTs are performed, the phase and amplitude errors cause a filter smearing. The amount of smearing may then be related to element performance. In the statistical averages computed below, the phase and gain averages will be done independently. This follows by taking ensemble averages over all elements MOD1, MOD2 . . .

To begin the analysis, let the IQ samples $x_0(k)$ without error be given by:

$$x_0(k) = A\, exp(2\pi j k/N) + L \qquad (3\text{-}1)$$

Here A is the voltage of the module under test, MODn, and L is the leakage voltage. Both may be complex. Equation 3-1 sets forth the response of a element MODn without error. The corresponding expression $x(k)$ with errors is:

$$x(k) = (A + \Delta A_k)\, exp[2\pi j(k + \Delta k)/N] + L \qquad (3\text{-}2)$$

The $\Delta A_k$ term is the absolute amplitude error of a given radiator for the kth time sample. The phase error term $\Delta k$ for phase shifter k is related to $\phi$, the RMS error in radians, by:

$$\phi^2 = \langle (2\pi \Delta k/N)^2 \rangle \qquad (3\text{-}3)$$

The angle brackets denote the ensemble average.

In what follows, it will be convenient to employ the following abbreviation:

$$W = exp(2\pi j/N) \qquad (3\text{-}4)$$

A useful relation for W is:

$$\frac{1}{N} \sum_{k=0}^{N-1} W^{km} = \delta_{0m} \qquad (3\text{-}5)$$

The Fourier transform of the rotated phase states becomes:

$$y(m) = \frac{1}{N} \sum_{k=0}^{N-1} x(k)\, W^{-km} \qquad (3\text{-}6)$$

The average power in filter m is thus $\langle |y(m)|^2 \rangle = P_m$.

Mathematical substitution and simplification yield the following result for $P_m$, the average power in filter m:

$$P_m \approx |L|^2 \delta_{0m} + |A|^2 \delta_{1m}(1-\phi^2) + \frac{|A|^2}{N}\left[\phi^2 + \left|\frac{b}{A}\right|^2\right] \qquad (3\text{-}18)$$

Equation (3-18) states that the power in filter m is the sum of three possible contributors: leakage power, the desired phase rotation power, and residual power due to imperfections in the phase and gain as the phase is rotated. The leakage is only in filter 0, as expected. The power in filter 1 is mainly the phase rotation term. The third term in Equation (3-18) is the leakage that occurs in all filters due to errors. The RMS phase and amplitude errors $\phi$ and b contribute an average power to each of the N=32 filters.

The respective powers 101, 103, 105 in filters 0, 1, and the remaining filters is shown graphically in FIG. 9. Spectral component 101 is the leakage power in filter 0. Spectral component 103 is the power from the module or element under test. Spectral component 105 represents power attributable to imperfections.

Based on Equation (3-18), heuristic, approximate rules, which may prove convenient and useful for evaluating active array elements, are derived. From Equation (3-18) for m>1:

$$[N\, P_m]/P_1 \approx \phi^2 + [b/A]^2 \qquad (3\text{-}19)$$

Thus, since N P(m) P(m) for m>i, the ratio of the powers in filters 2-31 to the power in filter 1 is approximately the combined amplitude and phase variance. Additionally, for the phase only error case, the effective sidelobe error SL is approximately given as:

$$SL \approx \phi^2 / \#\ elements \qquad (3\text{-}20)$$

A very bad sidelobe level is −45 db with 3000 elements. This implies $\phi^2 \approx 0.1$. This leads to the following rule for element quality:

Rule 1. If the sum of powers in filters 2-31 is greater than 10% of that in filter 1, then consider the element defective.

If there were only fractional amplitude error with variance $d^2$, then the resulting SL would be:

$$SL \approx d^2 / \#\ elements \qquad (3\text{-}21)$$

The same reasoning indicates that $d^2 \approx 0.1$ for the bad case of −45 db sidelobes. Since d is the fractional amplitude error, the amplitude is $(1+d)$ times the correct value. The power goes as $(1+d)^2$, which implies that for a nominal power in filter 1 of 0.5, these amplitude errors could lead to values between 0.87 and 0.29. This provides justification for a second heuristic rule:

Rule 2. If the power in filter 1 with half gain is less than 0.3 of the full gain value or greater than 0.8 of the full value, then consider the element defective. The half gain setting allows a partial check on the attenuator control.

These heuristic thresholds have not been rigorously justified. A set of detailed measurements of actual elements MOD1, MOD2 . . . will allow numerical refinement of the simple rules 1 and 2 tailored for particular systems.

From the foregoing analysis, the following preferred procedure for element testing is illustrated in FIG. 10 and summarized as follows:

(1) turn off all elements but the one under test, step 101.

(2) Set the RF frequency of the element under test to a mid-range value, step 103.

(3) Set the transmit and receive gains of the element under test to max, step 105.

(4) Cycle the element under test through all phase states sequentially for both transmit and receive (N phase states are assumed), step 107.

(5) Collect one IQ sample pulse for each case in step (4), step 107. The samples collected are thus:
[$x_R(0)$, $x_T(0)$, $x_R(1)$, $x_T(1)$, . . . , $x_R(N-1)$, $x_T(N-1)$]

(6) Take an FFT over the IQ sample set of transmit samples $\{x_T(k)\}$ and an FFT over the IQ sample set of received samples $\{x_R(k)\}$ and power detect, step 109. The filters are numbered 0—31 for each sample set $\{x_R(k)\}$ and $\{x_T(k)\}$.

(7) Perform a power comparison for each of the two sets of IQ samples, step 111: if the sum of powers in filters 2 through (N−1) is greater than 10% of that in filter 1 for either FFT, then reject the element under test.

(8) Set the transmit and receive gains to half maximum, then repeat steps 4–7, step 113.

(9) Perform a power comparison, step 115: compare filter 1 powers for the full and half gain cases for transmit and receive separately. If the half gain power is greater than 0.8 of the full gain, then reject the module. If the half gain power is less than 0.3 of the full gain, then reject the element under test.

In the foregoing, it will be appreciated that steps (1) to (5) and (8) are accomplished in a straightforward manner through program control of various module elements of FIG. 2 by the BSC 13 or similar processor. The processing is then done in a programmable signal processor which performs the computations, detection, and comparisons required by steps (6), (7), and (9), according to the equations set forth above. The tests set forth in the above procedure are by no means exhaustive, but are designed to easily pick up gross malfunctions. The crux of the method is the fact that leakage is essentially DC with respect to the settings of the phase shifters 33, 51.

It may be observed that the number of incremented phase states need not be N. For instance, if every other state is cycled through, then there are only N/2 FFT filters to consider. The leakage in this case is still in filter 0. The element signal is still in filter 1. The calibration time is then cut in half. However, this shorter method is not a thorough test of the module.

As the number of phase increments is reduced, the thresholds for rejection may vary. Also, the ratio of energies between filter 1 and the sum of the others may be less reliable. The trade-off between accuracy and time can best be gauged by measurements of any particular implementation.

Compensation for failed elements according to the invention means that the effective lifetime for an active array is greatly increased. The reliability and cost saving advantages are significant. The clear simplicity and ease of use of local compensation makes it the logical choice for any active array in subsequent company business.

The prior global compensation method has a number of disadvantages and only one benefit—namely, the ability to compensate for a larger fraction of failed elements. However, the local compensation technique can tolerate 6% failures for a typical antenna. With the expected failure rates for present and planned active array components, the time required to accumulate this many failures may exceed the planned lifespan of the aircraft. Also, more failures than 6% would result in a system degradation due to other effects than an increased sidelobe level toward the ground. In any case, global compensation offers no real advantage in terms of the magnitude of compensation.

When failures occur, the incremental compensation method improves radar performance because it lowers the two-way sidelobe level below the horizon by 4 dB. Incremental compensation decreases the sidelobes relative to the dark failed case, and it is effective for all scans of the antenna. Design considerations that maximize the performance of the radar include the following:

1. Different failures on transmit and receive lower the sidelobe level because there is little correlation, which would otherwise add an extra error. So circuitry which separates failures on transmit and receive will decrease the effect of correlation.

2. The complex voltage of each failure must be calculated each time the antenna beam is electronically scanned in a new direction. Saturation does not affect the compensation calculations.

3. The compensation method provides a choice of the fraction of the failed element to add and of the scan angle of the compensating subarray.

4. Incremental compensation increases the number of failures that can be tolerated for a certain sidelobe level. At that level, dark failure allows a certain percent of failed elements, which corresponds to a longer mean time between failures.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for compensating for a failed element of an active antenna array, said array including said failed element and a plurality of adjacent elements, said method comprising the steps of:
   turning the failed element off;
   selecting a plurality of said adjacent elements as local compensators; and
   adjusting the phase and voltage of each local compensator to compensate for said failure.

2. The method of claim 1 wherein the step of adjusting the phase and voltage includes the steps of dividing the magnitude of the voltage signal which would have been radiated by the failed element if it were working properly by the number of said local compensators to determine a voltage factor by which to increment the voltage of the signal radiated by each local compensator.

3. The method of claim 1 wherein the step of adjusting the phase and voltage further includes the step of determining a selected phase to be assigned to each local compensator.

4. The method of claim 2 wherein the step of adjusting the phase and voltage further includes the step of determining a selected phase increment assigned to each said voltage factor.

5. The method of claim 3 wherein said selected phase is determined so as to scan the voltage increment at a selected depression angle.

6. The method of claim 3 wherein said step of determining a selected phase further includes the step of determining a first phase increment by adding the phase of the original failed element to a phase increment $\Delta\phi$ and determining a second phase increment by subtracting $\Delta\phi$ from the phase of the original failed element.

7. The method of claim 6 wherein said phase increment $\Delta\phi$ is determined according to the equation:

$$\Delta\phi = \frac{2\pi s}{\lambda} \sin\theta$$

where s is the vertical spacing of the compensating elements above and below the failure; $\lambda$ is the wavelength of the emitted signal; and $\theta$ is a desired depression angle.

8. The method of claim 7 wherein the desired depression angle $\theta$ is 30 degrees.

9. The method of claim 4 wherein the selected voltage at the selected phase for each respective local compensator are added to the original complex voltage assigned to the respective local compensator to form an adjusted compensator voltage.

10. The method of claim 7 wherein the selected voltage at the selected phase for each respective local compensator are added to the original complex voltage assigned to the respective local compensator to form an adjusted compensator voltage.

11. The method of claim 9 wherein, if the magnitude of the adjusted compensator voltage exceeds the saturation amplitude of the local compensator element, the magnitude of the adjusted compensator voltage is set to said saturation value.

12. The method of claim 10 wherein, if the magnitude of the adjusted compensator voltage exceeds the saturation amplitude of the local compensator element, the magnitude of the adjusted compensator voltage is set to said saturation value.

13. The method of claim 1 wherein said failed element and the plurality of adjacent elements is a diamond lattice with said failed element lying at the intersection of first and second diagonal line segments, said local compensators comprising first, second, third, and fourth said elements, one disposed at each end of said first and second line segments.

14. The method of claim 11 wherein said failed element and the plurality of adjacent elements is a diamond lattice with said failed element lying at the intersection of first and second diagonal line segments, said local compensators comprising first, second, third, and fourth said elements, one disposed at each end of said first and second line segments.

15. The method of claim 1 wherein said failed element and the plurality of adjacent elements is a rectangular lattice comprising a matrix of rows and columns of elements and wherein a single element immediately above said failed element and a single element immediately below said failed element are selected as local compensators.

16. The method of claim 11 wherein said failed element and the plurality of adjacent elements is a rectangular lattice comprising a matrix of rows and columns of elements and wherein a single element immediately above said failed element and a single element immediately below said failed element are selected as local compensators.

17. The method of claim 1 wherein said step of locating includes the steps of:
evaluating the performance of a plurality of modules of said array, wherein said step of evaluating comprises the steps of:
determining an FFT power spectrum related to the operation of said module, said spectrum including a power component related to the module under test and a plurality of additional power components; and
comparing selected said components to evaluate the performance of said module.

18. The method of claim 1 wherein each element of said array includes a transmit phase shifter and a receive phase shifter, and said step of locating includes the step of testing each element of the array to detect a failed element, each element being tested by:
turning off all elements of the array but one, said one element comprising an element under test;
cycling said element under test through alternating receive and transmit states;
shifting the phase of the element under test after each successive pair of receive and transmit states;
sampling first and second signals, the first signal being representative of the transmit phase shifter output, the second signal being representative of the receive phase shifter output, said first signal being sampled during each transmit state, said second signal being sampled during each receive state;
collecting the output samples taken in the receive state into a first set and those taken in the transmit state into a second set;
determining the average power in a succession of Fourier transform filters taken over the samples of said first set;
determining the average power in a succession of Fourier transform filters taken over the samples of said second set; and
comparing the power in selected said filters and rejoicing the element under test as failed based upon said comparison.

19. The method of claim 18 wherein said samples comprise the output of a receiver supplied with in-phase and quadrature phase signals and wherein one output sample is collected for each phase state through which the element under test is shifted for both the transmit and receive states.

* * * * *

UNITED STATES PATENT AND TRADEMARK OFFICE
CERTIFICATE OF CORRECTION

PATENT NO. : 5,083,131
DATED : January 21, 1992
INVENTOR(S) : Michael D. Julian

It is certified that error appears in the above-indentified patent and that said Letters Patent is hereby corrected as shown below:

Claim 18, Column 14, line 56, delete "joicing" and insert therefor --jecting--.

Signed and Sealed this

Tenth Day of January, 1995

Attest:

BRUCE LEHMAN

Attesting Officer     Commissioner of Patents and Trademarks